US008081320B2

(12) United States Patent
Villar et al.

(10) Patent No.: US 8,081,320 B2
(45) Date of Patent: Dec. 20, 2011

(54) TILT CORRECTION SYSTEM AND METHOD FOR RAIL SEAT ABRASION

(75) Inventors: Christopher M. Villar, Liberty Hill, TX (US); John Anthony Nagle, II, Cedar Park, TX (US); Steven C. Orrell, Georgetown, TX (US)

(73) Assignee: Georgetown Rail Equipment Company, Georgetown, TX (US)

( * ) Notice: Subject to any disclaimer, the term of this patent is extended or adjusted under 35 U.S.C. 154(b) by 415 days.

(21) Appl. No.: 12/489,570

(22) Filed: Jun. 23, 2009

(65) Prior Publication Data
US 2009/0319197 A1 Dec. 24, 2009

Related U.S. Application Data

(63) Continuation-in-part of application No. 12/465,473, filed on May 13, 2009, which is a continuation-in-part of application No. 11/172,618, filed on Jun. 30, 2005, now Pat. No. 7,616,329.

(60) Provisional application No. 60/584,769, filed on Jun. 30, 2004.

(51) Int. Cl.
*G01B 11/24* (2006.01)
(52) U.S. Cl. ........................ 356/606; 238/264
(58) Field of Classification Search ........................ None
See application file for complete search history.

(56) References Cited

U.S. PATENT DOCUMENTS

| 3,562,419 | A | 2/1971 | Beckmann et al. | 178/6 |
| 4,700,223 | A | 10/1987 | Shoutaro et al. | 358/93 |
| 4,915,504 | A * | 4/1990 | Thurston | 356/604 |
| 5,245,855 | A | 9/1993 | Burgel et al. | 73/8 |
| 6,615,648 | B1 | 9/2003 | Ferguson et al. | 73/146 |
| 6,647,891 | B2 * | 11/2003 | Holmes et al. | 356/602 |
| 2002/0070283 | A1 * | 6/2002 | Young | 238/264 |
| 2003/0140509 | A1 | 7/2003 | Casagrande | |
| 2004/0088891 | A1 | 5/2004 | Theurer | |
| 2004/0122569 | A1 | 6/2004 | Bidaud | |
| 2006/0017911 | A1 | 1/2006 | Villar et al. | 356/4.01 |

FOREIGN PATENT DOCUMENTS

| DE | 10040139 | 3/2003 |
| FR | 2674809 | 10/1992 |
| JP | 2000/221146 A1 | 8/2000 |
| RU | 1418105 | 8/1988 |
| RU | 2142892 | 12/1999 |

OTHER PUBLICATIONS

Decision on Grant, dated Oct. 22, 2009, for corresponding Russian patent application No. 2007103331.
PCT International Search Report and Written Opinion dated Apr. 22, 2010 for corresponding PCT/US2010/025004.
Supplementary Search Report for European Application No. EP 05767776.7 dated May 2, 2011.

* cited by examiner

*Primary Examiner* — Gregory J Toatley
*Assistant Examiner* — Juan D Valentin
(74) *Attorney, Agent, or Firm* — Parsons Behle & Latimer

(57) ABSTRACT

A system and method for determining rail seat abrasion of a rail road track is disclosed. An inspection system comprises lasers, cameras, and processors adapted to determine whether rail seat abrasion is present along the track. The processor employs a mathematics based algorithm which compensates for tilt encountered as the inspection system moves along the track.

17 Claims, 12 Drawing Sheets

TILT CORRECTION SYSTEM AND METHOD FOR RAIL SEAT ABRASION

CROSS REFERENCE TO RELATED APPLICATIONS

This application is a continuation-in-part of U.S. application Ser. No. 12/465,473, entitled, "SYSTEM AND METHOD FOR INSPECTING SURFACES USING OPTICAL WAVELENGTH FILTERING, filed May 13, 2009, naming John Nagle, Steven C. Orrell, Christopher Villar, and Charlie Aaron as inventors, which is a continuation-in-part of U.S. application Ser. No. 11/172,618, entitled, "SYSTEM AND METHOD FOR INSPECTING RAILROAD TRACK, filed Jun. 30, 2005 now U.S. Pat No. 7,616,329 and naming John Nagle, Christopher Villar and Steven Orrell as inventors, which is a non-provisional application claiming benefit of U.S. Provisional Application Ser. No. 60/584,769, also entitled, "SYSTEM AND METHOD FOR INSPECTING RAILROAD TRACK, filed Jun. 30, 2004, naming John Nagle and Steven C. Orrell as inventors, each being hereby incorporated by reference in their entirety.

FIELD OF THE INVENTION

The present invention relates generally to systems and methods for inspecting railroad surfaces and, more particularly to systems and methods for determining rail seat abrasion via the utilization of tilt correction algorithms.

BACKGROUND OF THE INVENTION

Railroads are generally constructed on a base layer of compacted, crushed stone material. A layer of gravel ballast rests on top of this stone layer. Crossties are laid in and on this ballast layer, and two parallel steel rails are attached to the crossties with fasteners. The majority of crossties in service are made of wood. Various other materials are used such as concrete, steel, and composite or recycled material in the manufacture of crossties.

The ties are normally paced on top of the track ballast. The remaining construction differs slightly depending on the type of tie material useds. If wood ties are used, tie plates are then placed on top of the ties. Rails are then placed on top of the tie plates. The rails are then fastened to the ties through the use of spikes or bilts driven through holes in the tie plates. When concrete ties are used, rails are placed on top of the ties, with a thin polymer pad preventing direct contact between the steel and the concrete. Steel clips are often used to fasten the rail to the tie. Additional track ballast is then used to fill spaces between and around the ties to assist in anchoring.

Normal railroad traffic causes friction between ties and rails, as well as rails and spikes, bolts, screws, or clips, and the surface under the ties. Of particular concern is friction at the point where the rail seats against the tie. Wear at this point, also known as rail seat abrasion, directly impacts the life of the tie by causing it to loosen from the rail. In spite of the pads used between rails and concrete ties, rail seat abrasion remains a continuing problem with concrete ties.

When the rail seat wears, it affects the amount of tension on the fastener so that the rail mounting force required to firmly affix it to the tie is not achieved. Should this happen, the rail can slide against the tie, which increases the rate of abrasion. Rail slide can also cause rail welds to pull apart, either from stress or from temperature misalignments. Another concern with rail seat abrasion is that it increases the exposure of the surface of the ties to environmental conditions, further accelerating rail seat abrasion and tie degradation. Additional causes or contributing factors to rail seat abrasion can include manufacturing defects, temperature variation patterns, railroad arrangements, such as curvature, grade, and banking, and the state of the pad used between rail and tie.

Measurement has been conducted to monitor the wear of concrete ties, either by direct manual measurement, or through the use of electronic devices installed below individual railroad ties. All previous methods have proved either unreliable, hazardous, labor-intensive, requiring extensive equipment installation, or having a major impact on the availability of railroads to train traffic.

In view of the foregoing, the present invention is directed to overcoming, or at least reducing the effects of, one or more of the problems set forth above, thereby providing a system capable of predicting instances of rail track abrasion without the need for hazardous and unreliable manual measurements or costly electronic measurement devices.

SUMMARY OF THE DISCLOSURE

Exemplary systems and methods for determining rail seat abrasion of a rail road track are disclosed. Embodiments of the disclosed system includes an inspection system comprising lasers, cameras, and processors adapted to determine whether rail seat abrasion is present along the track. The processor employs a mathematics based algorithm which compensates for tilt encountered as the inspection system moves along the track.

Exemplary methods of the present invention comprise the steps of moving the inspection system along the track, receiving image data corresponding to the track, determining measurements of the rail seat abrasion for various portions of the track, wherein the measurements adjust for tilt encountered as the inspection system moves along the track.

By mounting measurement devices on the inspection vehicle that traverses the track, taking precise measurements of the height of the rail and the tie, and adjusting these measurements for any expected tilt encountered, instances of rail track abrasion can be predicted without the need for hazardous raising of rails for unreliable and time-consuming manual measurements, or for costly and labor intensive installation of electronic measurement devices under individual ties.

The foregoing summary is not intended to summarize each potential embodiment or every aspect of the subject matter of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Figure 1:
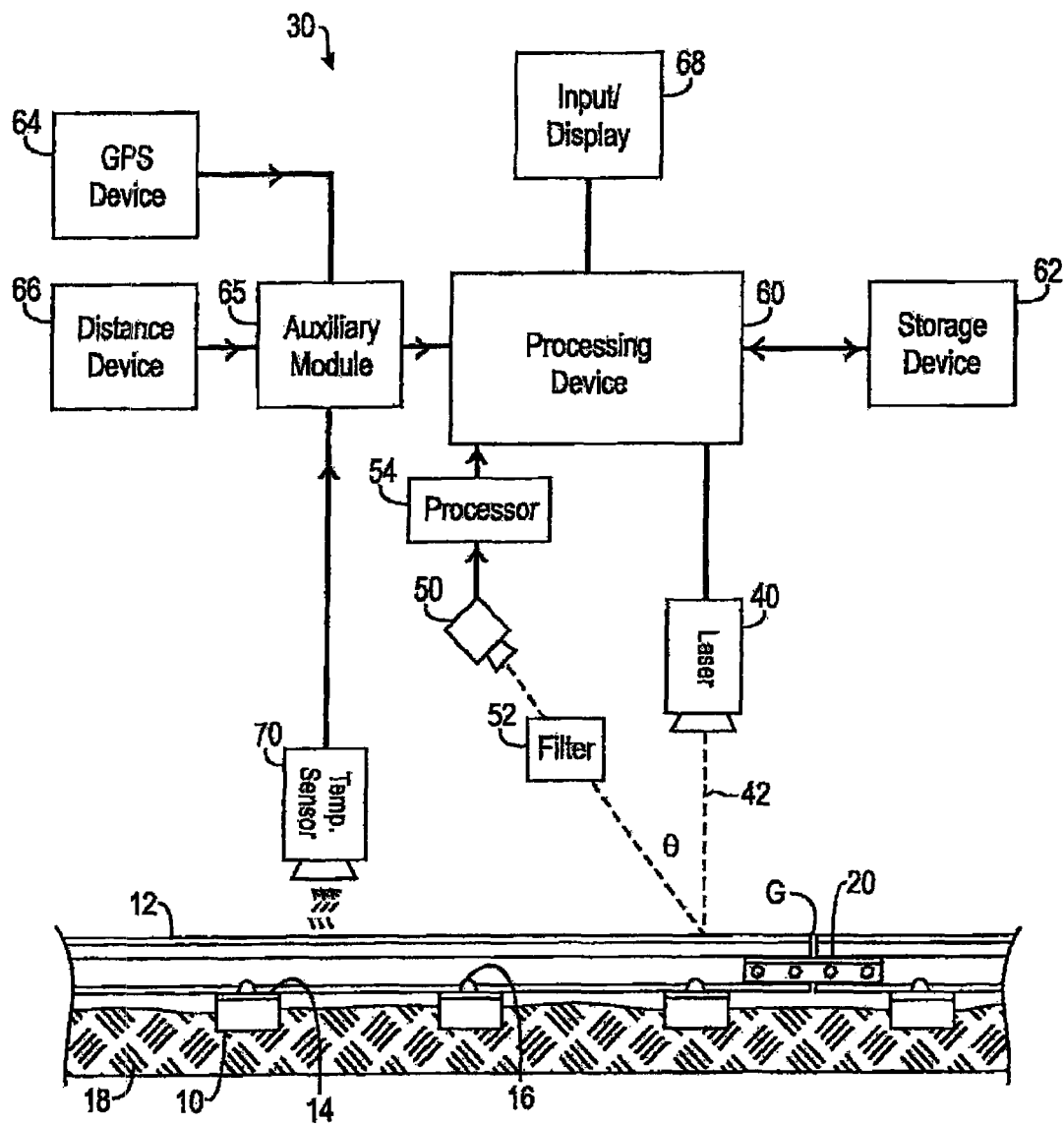
FIG. 1 schematically illustrates an embodiment of the disclosed inspection system.

While the disclosed inspection system and associated methods are susceptible to various modifications and alternative forms, specific embodiments thereof have been shown by way of example in the drawings and are herein described in detail. The figures and written description are not intended to limit the scope of the disclosed inventive concepts in any manner. Rather, the figures and written description are provided to illustrate the disclosed inventive concepts to a person skilled in the art by reference to particular embodiments, as required by 35 U.S.C. §112.

DETAILED DESCRIPTION OF ILLUSTRATIVE EMBODIMENTS

Figure 2:
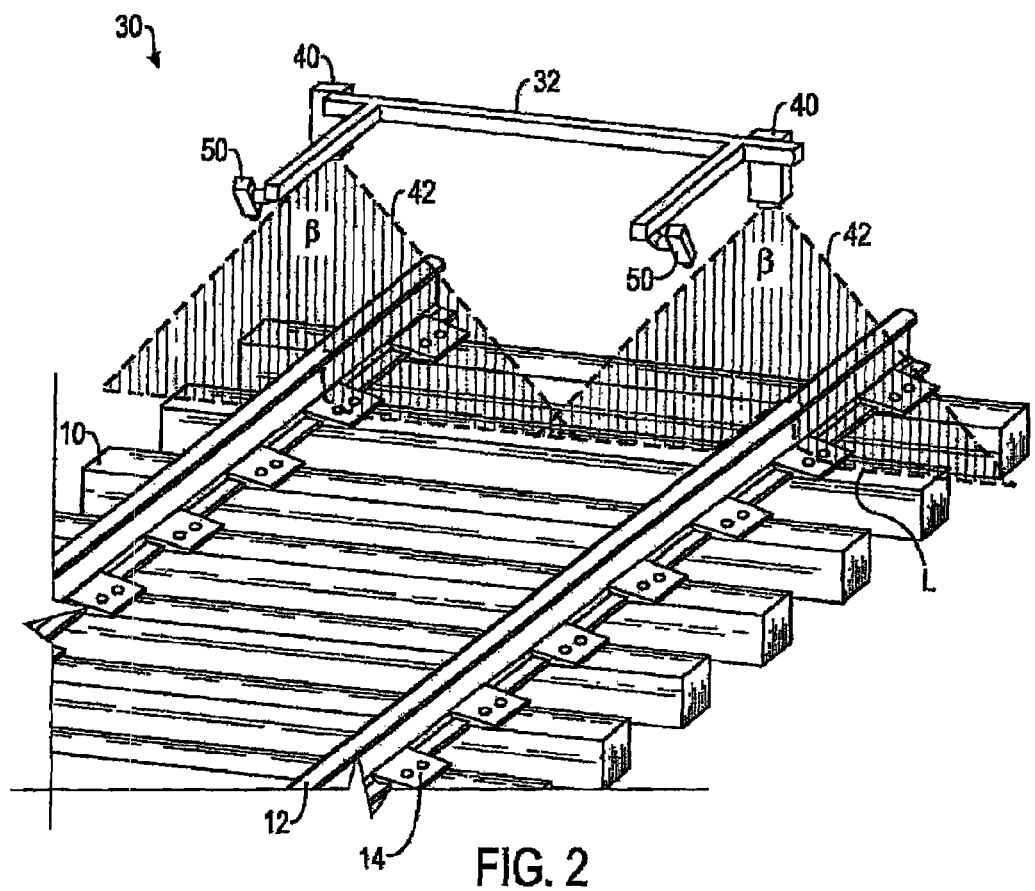
FIG. 2 illustrates a portion of an embodiment of a system for inspecting railroad track according to certain teachings of the present disclosure.

Referring to FIGS. 1 and 2, an exemplary embodiment of a system 30 for inspecting railroad track according to certain teachings of the present disclosure is illustrated. In FIG. 1, the disclosed inspection system 30 is schematically illustrated relative to a railroad track. In FIG. 2, a portion of the disclosed inspection system 30 is illustrated in a perspective view relative to railroad track.

As best shown in FIG. 1, the exemplary disclosed inspection system 30 includes a light generator such as a laser 40, a device for receiving light reflected from the area to be inspected such as a camera 50, and a processing device 60. In the implementation shown in FIG. 1, the disclosed inspection system 30 is used to survey the track bed of a railroad track. Although the disclosed inspection system and associated methods are described for use in inspecting railroad track, it will be appreciated with the benefit of the present disclosure that the disclosed system and method can be used in other areas and in industries where surfaces or components require inspection. For example, the disclosed inspection system and method can be used to inspect roads, electrical lines, piping, or other networks or systems.

The track bed includes crossties 10, rails 12, tie plates 14, spikes 16, and ballast 18. Briefly, the laser 40 projects a beam 42 of laser light at the track bed. The beam 42 produces a projected line L, shown in FIG. 2, on the track bed that follows the contours of the surfaces and components of the track bed. The light receiver, camera 50, captures an image of the line L of laser light 42 projected on the track bed. The camera 50 sends the captured image to the processing device 60 for processing and analysis as described in more detail below.

As best shown in exemplary embodiment of FIG. 2, pairs of lasers 40 and cameras 50 are positioned above each one of the rails 12 of the track. The lasers 40 and the cameras 50 can be assembled onto a rigid framework 32, which can be mounted on an inspection vehicle (not shown) or other device moving along the track so as to maintain the inspection system 30 in the proper position. Only a portion of the framework 32 is shown in FIG. 2 for simplicity. However, it is understood that other known components for the framework 32 may be needed to mount the lasers 40 and the cameras 50 on an inspection vehicle.

In general, the inspection vehicle can be any suitable vehicle for traveling along the railroad track. For example, a common practice in the art is to equip a normal highway vehicle, such as a pick-up truck, with "hi-rail" gear mounted to the frame of the vehicle. Hi-rail gear typically includes a set of undersized railroad stock wheels that allow the highway vehicle to ride along the rails. In one embodiment, then, the framework 32 of the disclosed inspection system 30 can be mounted in the bed of a pick-up truck having "hi-rail" gear. Alternatively, the inspection vehicle can be maintenance of way (MoW) equipment that is specifically designed for working along the railroad track. In addition, the disclosed inspection system 30 can be mounted on a chassis that is towed by a vehicle or can be mounted on a locomotive or freight car.

As best shown in FIG. 2, the lasers 40 project a beam 42 of light having a predetermined angular spread $\beta$. The angular spreads $\beta$ of the two lasers 40 cover substantially the entire surface of the track bed. In this way, the lasers 40 produce a projected line L that is substantially straight and extends substantially across the track bed. Each laser 40 preferably produces a beam 42 having an angular spread $\beta$ of about 60-degrees and covers approximately one half of the track bed. Preferably, the lasers 40 project the beam 42 substantially perpendicular to the surface of the track. Alternatively, a single laser could be used that is positioned such as to create the projected line L across the track bed.

In addition, the lasers 40 are preferably infrared lasers having 4-watts of optical output and producing light at an infrared wavelength of about 810-nm. The relatively high optical output of the lasers 40 helps reduce effects of ambient light so that shielding is not necessary. A suitable laser for the disclosed inspection system 30 includes a Magnum laser manufactured by Stocker Yale. The parameters described above for the lasers 40 are preferred for inspecting the surface of a railroad track. However, those ordinarily skilled in the art having the benefit of this disclosure realize the present invention may be utilized to inspect a variety of other surfaces. Other implementations of the disclosed inspection system 30 can use an alternate number of light sources as well as different wavelengths, optical outputs, and angular spreads.

As best shown in FIG. 2, the cameras 50 are positioned adjacent the lasers 40. As best shown in FIG. 1, the cameras 50 are mounted at an angle $\theta$ with respect to the beam 42 of light projected from the lasers 40. In one embodiment, the cameras are positioned at an angle $\theta$ of about 60-degrees. As the disclosed inspection system 30 is moved along the track, the cameras 50 capture an image or frame of the track bed at small, regular increments. Preferably, the cameras 50 are capable of a substantially high frame rate, such as about 5405 frames per second.

Each still image or frame captured by the cameras 50 is then filtered and processed to isolate the contoured laser line L projected on the track bed. The cameras 50 are fitted with band-pass filters 52 that allow only the radiant energy substantially at the preferred infrared wavelength of the lasers 40 to pass. Because the wavelength of the lasers 40 is about 810-nm, the band-pass filters 52 of the cameras 50 can eliminate substantially all ambient light so that the camera 50 acquires a substantially clear, still image of the projected line L of light from the lasers 40.

Each of the two cameras 50 send image data directly to the processing device or computer 60 via wired or wireless transmission lines. Preferably, the camera 50 includes a processor 54 capable of converting or formatting the captured image of the projected line L into a dimensional profile that is sent directly to the processing device or computer 60. The ability of the camera 50 to process or format the captured image in this way can eliminate the need for expensive post processors or high-speed frame grabbers. A suitable camera for the disclosed inspection system 30 having such processing abilities includes a Ranger M50 manufactured by IVP Integrated Vision Products, Inc.

Among other common components, the processing device or computer 60 includes a microprocessor, inputs, outputs, and a data storage device 62. The data storage device 62 can include a hard drive, a non-volatile storage medium, a flash memory, tape, or CD-ROM. The processing device 60 can further include an input/display 68 for a track inspector to input and review data and to operate the disclosed inspection system 30. The processing device 60 operates with suitable software programs for storing and analyzing the various data obtained with the disclosed inspection system 30. For example, the processing device 60 can have any suitable image processing software, such as Matrox MIL, Common VisionBlox, Labview, eVision, Halcon, and IVP Ranger. For example, the processing device 60 can have image processing tools known in the art for analyzing image data from the cameras 50 such as Region of Interest (ROI) tools, filtering tools, blob tools, edge finders, histogram tools, and others.

To effectively process all of the data obtained with the disclosed inspection system 30, the processing device 60 in a preferred embodiment includes a computer having a fast processor, such as an Intel Pentium 4 processor capable of running at 2.8 GHz. To effectively store all of the data obtained with the disclosed inspection system 30, the storage device 62 preferably includes two large-capacity hard drives configured to use both read/write mechanisms simultaneously as one drive, which is also known as a Redundant Array of Independent Disks (RAID) system. The fast processor of the processing device 60 and the dual hard drives of the storage device 62 allow for sustained real-time storage of the data obtained with the disclosed inspection system 30. In a preferred embodiment, the power for the disclosed inspection system 30 can be provided by 110 V AC power from a belt driven generator running directly off the engine of the inspection vehicle.

Figure 3:
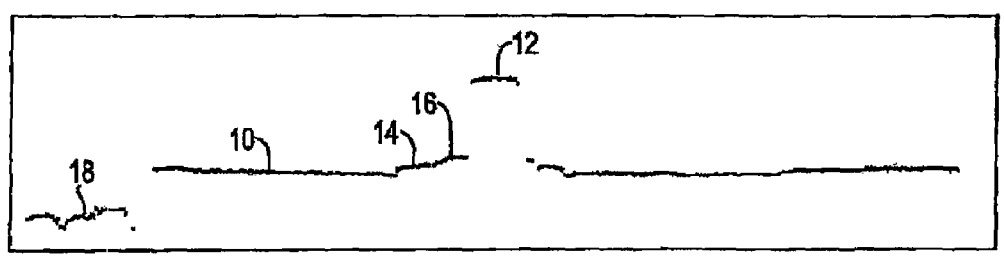
FIG. 3 illustrates an example frame of a portion of railroad track obtained with the disclosed inspection system.

With the beams 42 projected onto the irregular surface of the track and viewed at an angle, the projected line L shown in FIG. 2 follows the contours of the surface and components of the track bed. An example image or frame showing the projected line L of the track bed is shown in FIG. 3. The image data or frame includes a plurality of pixels given X-Y coordinates and shows a contour of the track bed captured by the cameras 50. Due to filtering and other image processing techniques known in the art, the image includes two pixel values, where the dark pixels represent the contour of the track bed. Every pixel of a given image data is given the same Z-coordinate, which represents the particular position along the length of the track at which the image data was captured. In this manner, a plurality of captured images produce a three-dimensional scan of the track bed in which each image of the scan has X-Y coordinates showing the contour of the track bed and has a Z-coordinate representing the particular position of the contour along the length of rail.

It is understood that the speed at which an image is captured is limited by the width and height of the scanned area, the distance between the discrete still images, the resolution of the still images, the maximum frame rate of the cameras 50, the processing speed of the computer 60, and the write speed of the data storage device 62. For a railroad application of the disclosed inspection system 30, one preferred example is spacing between still images or frames captured by the cameras 50 of about 0.1-inch, a preferred velocity of the inspection vehicle of about 30-mph, a preferred height of the scanned area of approximately 10 inches, and a preferred width of the scanned area of about 10-feet across the width of the track bed. To satisfy these preferred parameters, a camera system capable of about 5405 frames per second and a computer system capable of processing and recording at about 8.3 MPS is preferred. Each frame or image, such as shown in FIG. 3, may require about 1,536 bytes of storage. With a frame captured at about every 0.1-inches along the length of track, about 633,600 frames would be captured for one mile of track and would require 0.973 gigabytes of storage space.

Another embodiment and as shown in FIG. 1, the disclosed inspection system 30 may further include a Global Position System (GPS) receiver 64 for obtaining geographical locations of the inspection vehicle when inspecting the railroad track. The GPS receiver 64 can include any suitable GPS receiver known in the art for obtaining geographical locations. For example, the GPS receiver 64 can be an independent, commercially available unit mounted on the inspection vehicle and connected to the processing device 60 with a suitable cable connection and input/output interface. The GPS receiver 64 can obtain the geographical location using a differential or non-differential GPS system. Techniques for obtaining substantially accurate location and time data with a GPS receiver 64 are well known in the art and are not discussed further. The geographical locations are sent to the processing device 60 and can be compiled with the image data of the track bed.

When the image data from the cameras 50 is recorded, the geographical location of the frame can also be recorded. Eliminating a continuous stream of geographical location data from the GPS receiver 64 to the computer 60 can free the processor time available for capturing the image data with the processing device 60. Therefore, the GPS receiver 64 preferably feeds data to an auxiliary module 65. The auxiliary module 65 packages this data and sends the data to the processing device or computer 60 when queried. In addition to obtaining geographical location data, the GPS receiver 64 can obtain time data. Furthermore, the location and time data obtained with the GPS receiver 64 can be used to determine other variables, such as the speed of the inspection vehicle, which can be used for various purposes disclosed herein. Thus, the disclosed inspection system 30 can use data from the GPS receiver 64 to trigger the cameras 50 to capture a still image of the track bed at about every 0.1-inches along the rail.

In an alternative exemplary embodiment and as shown in FIG. 1, the disclosed inspection system 30 can include a distance device 66 for obtaining geographical locations of the inspection vehicle when inspecting the rail. The distance device 66 can be an encoder that counts wheel revolutions or partial revolutions as the inspection vehicle moves along the rail or can be the existing odometer sensor on the inspection vehicle. The distance device 66 can provide location data to the processing device 60. Using the distance device 66, the disclosed inspection system 30 can trigger the cameras 50 to capture a still image of the track bed at about every 0.1-inches along the rail.

In another exemplary embodiment, the disclosed inspection system 30 can capture still images of the track bed at or near the maximum frame rate of the cameras 50 without being triggered by the GPS receiver 64 or distance device 66. For example, the cameras 50 and processing device 60 can operate at or near the maximum frame rate while the inspection vehicle travels along the track. Using the known average width of a crosstie 10 or tie plate 14, the disclosed inspection system 30 can calculate the velocity of the inspection vehicle. The disclosed system can then delete any extra frames to reduce data storage so that the retained frames would have an approximate spacing of 0.1-inch. It is understood that exact spacing of 0.1-inch may not always be possible, but the spacing will be known and may be between 0.05" and 0.1". In this embodiment, the same number of frames must be discarded between each retained frame on a given tie so that frame spacing remains uniform. For example, if the tie plates are known to be 8-inches wide and 244 frames are captured for a specific tie plate, then two frames can be discarded between each retained frame. If the entire set of frames were numbered 1 through 244, then the retained frames would be those numbered: 1, 4, 7, 10, . . . 241, 244. The retained 82 frames would have a calculated spacing of 0.098-inch.

Alternatively, the disclosed system could interpolate between any two captured frames to create a new third frame at any desired location along the track. Some frames could then be discarded to achieve the exact frame spacing desired.

After the disclosed inspection system 30 completes a survey of railroad track, computer analysis of the image data is performed. The computer analysis can be performed by the processing device or computer 60 located in the inspection vehicle. Alternatively, the computer analysis can be performed by another computer system having image processing software known in the art. The computer analysis searches the image data and determines or detects locations along the track where defects occur or where allowable tolerances of the railroad track are not maintained. For a particular implementation, the computer analysis can be customized or changed. The geographic locations of defects or unallowable tolerances can be provided so that appropriate repairs can be made or maintenance work can be scheduled.

A number of measurable aspects of the railroad track can be determined or detected from the image data of the track bed obtained with the disclosed inspection system and associated methods. In examples that follow, a number of such measurable aspects are discussed, and various techniques for analyzing the measurable aspects are disclosed. It will be appreciated that these and other measurable aspects of the railroad track can be determined or detected from the image data of the track bed obtained with the disclosed inspection system. In addition, it will be appreciated that other techniques known in the art for analyzing the image data can be used with the disclosed inspection system and associated methods, and that surfaces other than railroad components may be inspected. Accordingly, the disclosed inspection system and associated methods are not intended to be limited to railroad inspection or the measurable aspects and particular techniques described herein.

Figure 11:
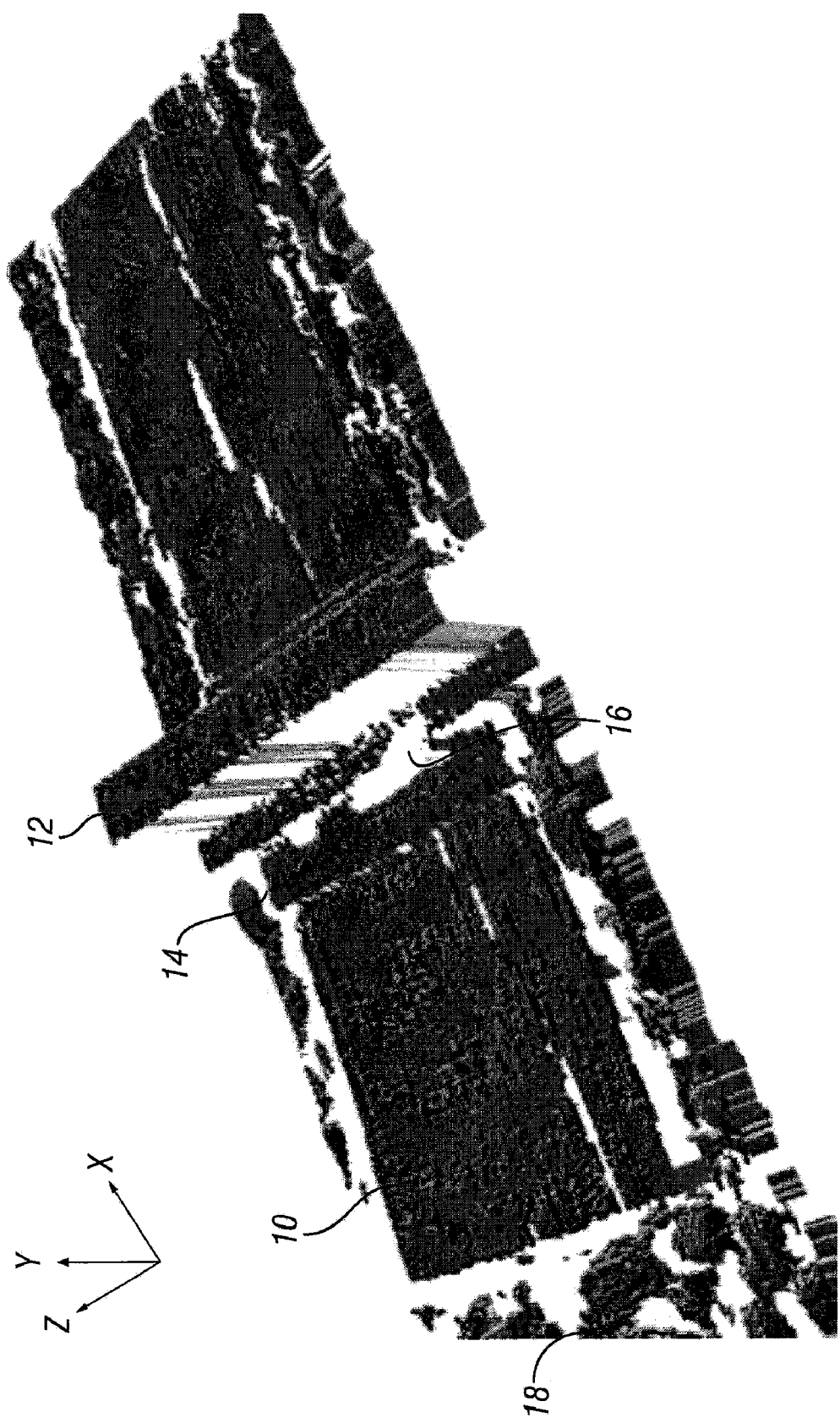
FIGS. 11 and 12 illustrate three-dimensional compilations of image data obtained with the disclosed inspection system.
Figure 12:
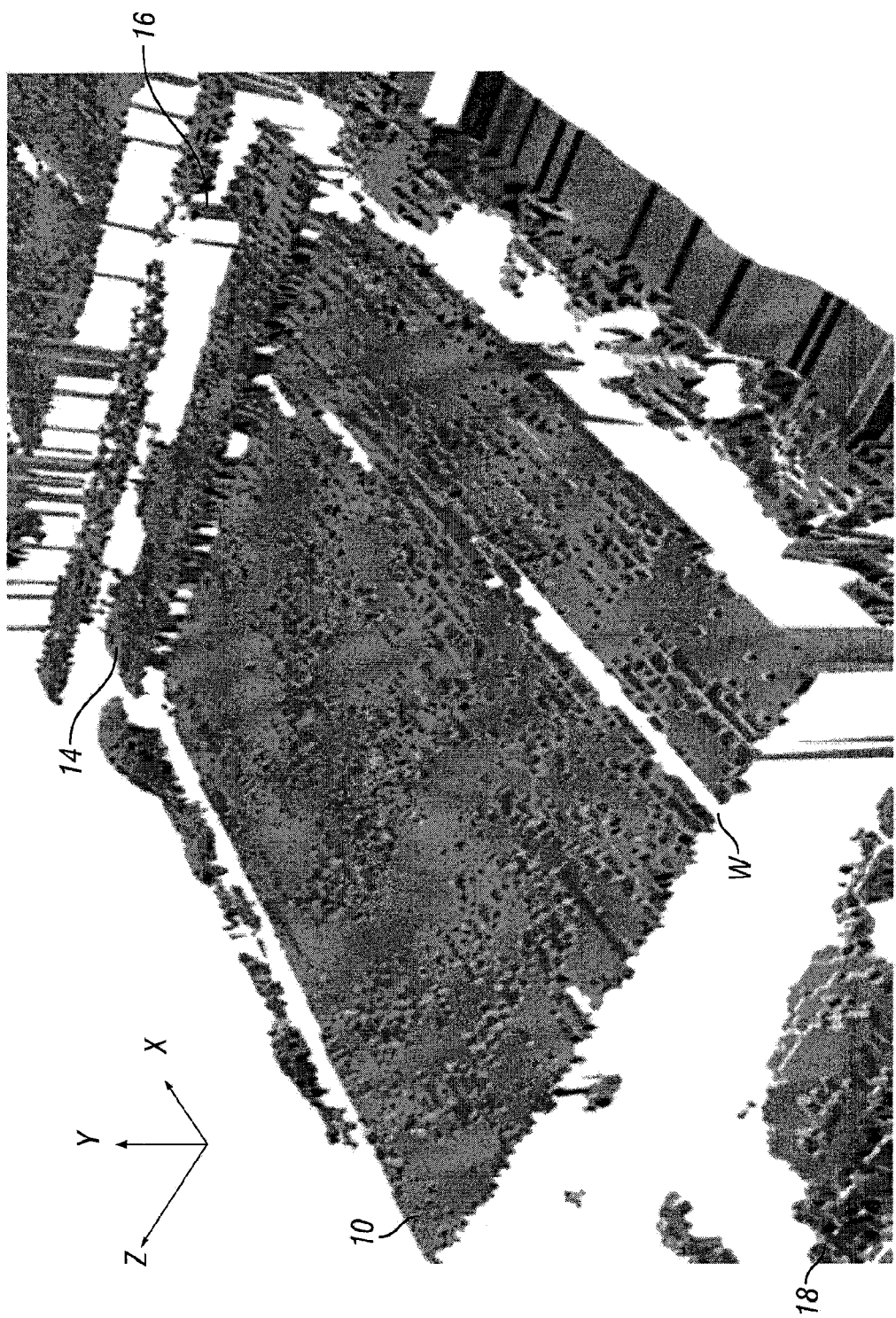

For clarity, FIGS. 11 and 12 illustrate example compilations of image data obtained with the disclosed inspection system and associated methods. FIG. 11 has a plurality of compiled image data showing a portion of a crosstie, tie plate, and rail in a perspective view. FIG. 12 has a plurality of compiled image data showing a more detailed perspective view. As can be seen in FIGS. 11-12, the compiled image data forms a three-dimensional representation (X, Y, and Z) of the area of the track bed. The representation has substantial detail, and various aspects of the components of the track bed can be measured. In FIGS. 11-12, for example, cracks or splits in the crosstie 10 are visible. Also, the height of the crosstie 10 with respect to the ballast layer 18 is visible. The orientation and heights of the tie plate 14 and rail 12 are visible. These and other details can be obtained with the disclosed inspection system and associated methods as described in more detail below.

Figure 4A:
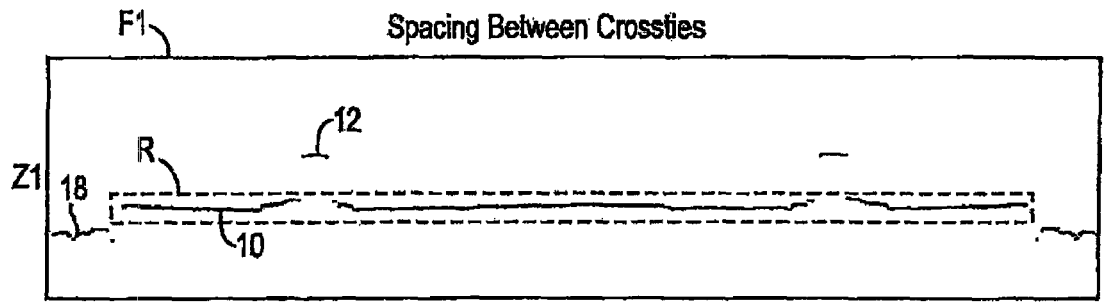
FIGS. 4A-4C illustrate example frames of railroad track obtained with the disclosed inspection system for determining the spacing between the crossties.
Figure 4B:
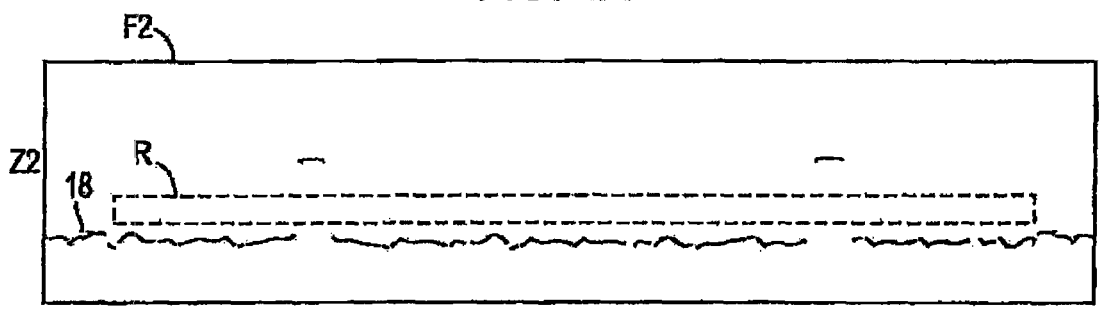
Figure 4C:
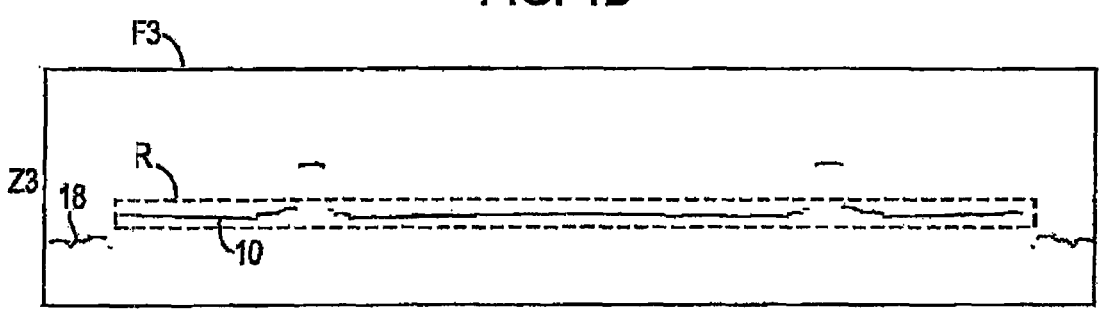

In one example, the spacing between crossties can be determined from the plurality of image data. Referring to FIGS. 4A-4C, example frames of the track bed obtained with the disclosed inspection system 30 are illustrated that can be used to determine the spacing between the crossties 10. FIG. 4A shows an end frame F1 having a contour of a first crosstie 10 that is at position Z1 along the track. This end frame F1 may designate the last frame showing this crosstie 10. FIG. 4B shows an intermediate frame F2 captured some time after the end frame F1 and at a further position Z2 along the track. This intermediate frame F2 lacks a crosstie because it designates a location between crossties of the track. It is understood that a plurality of such intermediate frames will follow the end frame F1 of FIG. 4A. FIG. 4C shows an end frame F3 having another crosstie 10' that is at further position Z3 along the track. Computer analysis can determine the spacing between crossties 10 and 10' by, for example, first counting the number of such intermediate frames F2 lacking a crosstie. This number of intermediate frames F2 can then be multiplied by the known spacing between frames (e.g., 0.1-inch) to calculate the distance between crossties 10 and 10'. In this way, a substantially accurate measurement between crossties of the track bed can be obtained without the need for a track inspector to physically inspect the crossties. Instead, the image data that forms the three-dimensional scan of the track bed is used.

Determining whether a frame has a crosstie or not can be performed by imaging techniques known in the art. For example and as shown in FIG. 4A-4C, the contour of a crosstie 10 is expected in a region of interest R of the frames F1-F3. Computer analysis can search the region of interest R of a frame for pixels indicating the presence of a crosstie. This can be done, for example, by averaging or summing the value of pixels in the region of interest R. Because the contour of the crosstie is composed of dark pixels, the region of interest R in a frame F1 having a crosstie 10 will have a greater average or sum than the region R in an intermediate frame F2 lacking a crosstie.

Figure 5:
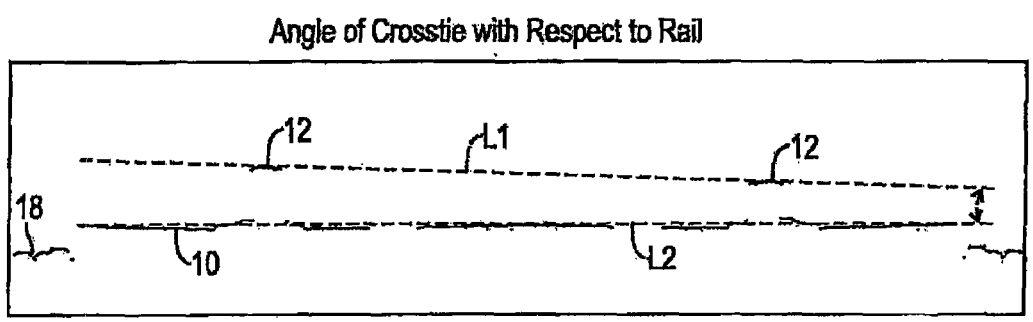
FIG. 5 illustrates an example frame of railroad track obtained with the disclosed inspection system for determining the angle of the crosstie with respect to the rail.

In another example, the angles of the crossties with respect to the rail can be determined from the image data. Referring to FIG. 5, an example frame of railroad track obtained with the disclosed inspection system is illustrated. The angular orientation of the heads of the rails 12 can be represented by a line L1. The line L1 can be estimated, for example, by best fit or curve fitting techniques known in the art. Similarly, the angular orientation of the crosstie 10 can be represented by a line L2. The line L2 can also be estimated, for example, by best fit or curve fitting techniques known in the art. These lines L1 and L2 can be averaged from several of the frames along the Z-axis near the crosstie 10. Computer analysis can then determine the angular relation between these lines L1-L2 to determine the angles of the ties with respect to rail. This condition would indicate either worn rail or a plate cut condition on a wooden crosstie.

Figure 6A:
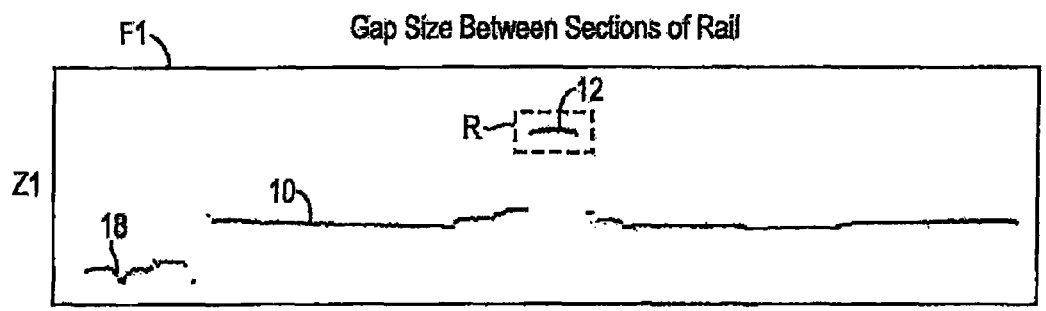
FIGS. 6A-6C illustrate example frames of railroad track obtained with the disclosed inspection system for determining a break or separation in the rail.
Figure 6B:
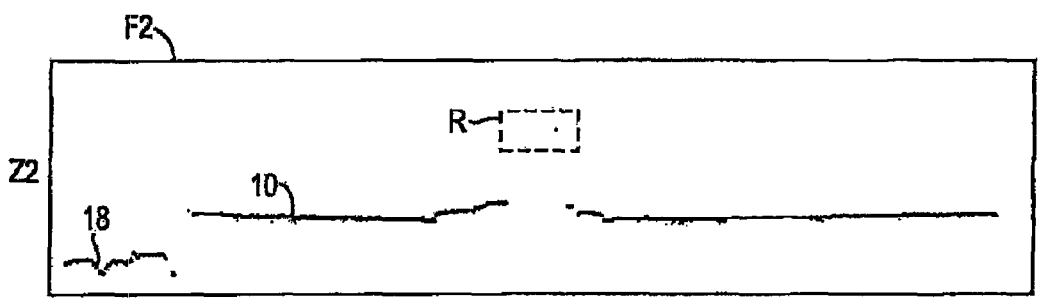
Figure 6C:
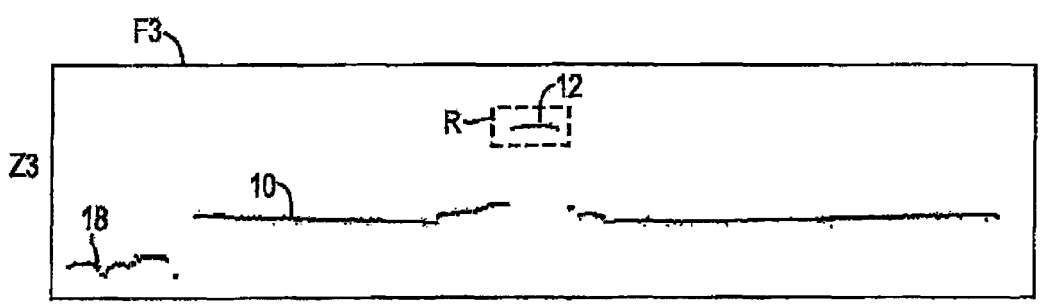

In another example, a break in the rail can be determined from the image data. Referring to FIGS. 6A-6C, example frames F1-F3 of railroad track obtained with the disclosed inspection system are illustrated that can be used to determine the separation of rail 12. FIG. 6A shows an end frame F1 having an end of a first rail 12 that is at position Z1 along the track. This end frame F1 designates the last frame showing this rail 12. FIG. 6B shows an intermediate frame F2 captured some time after the end frame F1 and at a further position Z2 along the track. This intermediate frame F2 lacks a rail because it represents a location between rails of the track. It is understood that a plurality of such intermediate frames F2 may follow the end frame F1 of FIG. 6A. FIG. 6C shows another end frame F3 having another rail 12' that is at further position Z3 along the track. Computer analysis can determine the spacing between the rails 12 and 12', for example, by first counting the number of intermediate frames F2 lacking a rail. This number of intermediate frames F2 can then be multiplied by the known spacing between frames (e.g., 0.1-inch) to calculate the distance between the rails 12 and 12'.

Determining whether a frame has a rail 12 or not can be performed by imaging techniques known in the art. For example and as shown in FIG. 6A-6C, the contour of a rail 12 is expected in a region of interest R of the frames F1-F3. Computer analysis can search the region of interest R of a frame for pixels indicating the presence of a rail contour. This can be done by averaging or summing the value of pixels in the region of interest, for example. Because the contour of the rail is composed of dark pixels, the region of interest R in a frame F1 having a rail 12 will have a greater average or sum than the region R in a frame F2 lacking a crosstie.

Figure 7A:
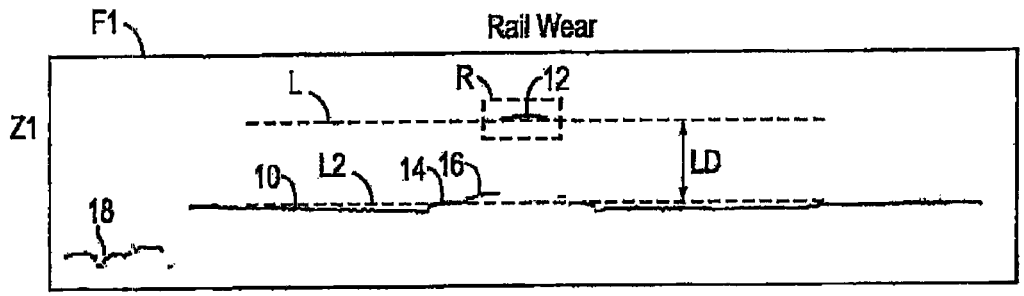
FIGS. 7A-7B illustrate example frames of railroad track obtained with the disclosed inspection system for determining wear of the rail.
Figure 7B:
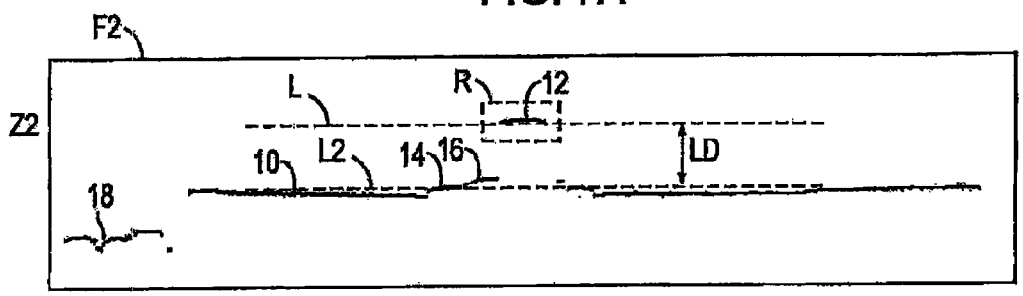

In another example, the wear of the rails can be determined from the image data. Referring to FIGS. 7A-7B, example frames F1-F2, of railroad track obtained with the disclosed inspection system, are illustrated and can be used to determine wear of the rail 12. Computer analysis can determine if a rail 12 has wear, for example, by determining whether the distance between the contour of the rail 12 and a reference point in a frame is less than the same distance in a prior frame. FIG. 7A shows a frame F1 having rail 12 that is at a position Z1 along the track. The contour of the rail 12 lies within a region of interest R and at a level L along the Y-axis of the frame F1. The contour of rail 12 is above a reference level L2, which may be the height of a tie plate, a measurable distance LD. As would be apparent to one of ordinary skill in the art having benefit of this disclosure, reference L2 may be located at a number of reference points such as tie plates 14, spikes 16, or crossties 10, for example. FIG. 7B shows another frame F2 at another position Z2 along the track. At position Z2, the distance LD is less between the contour of the rail 12 and level L2 than at position Z1. Thus, frame F2 may indicate wear of the rail 12 at the position Z2 along the track. As would be apparent to one of ordinary skill in the art having benefit of this disclosure, rail wear could also be determined comparing frames taken at different times, but at the same position along a track bed.

Figure 8:
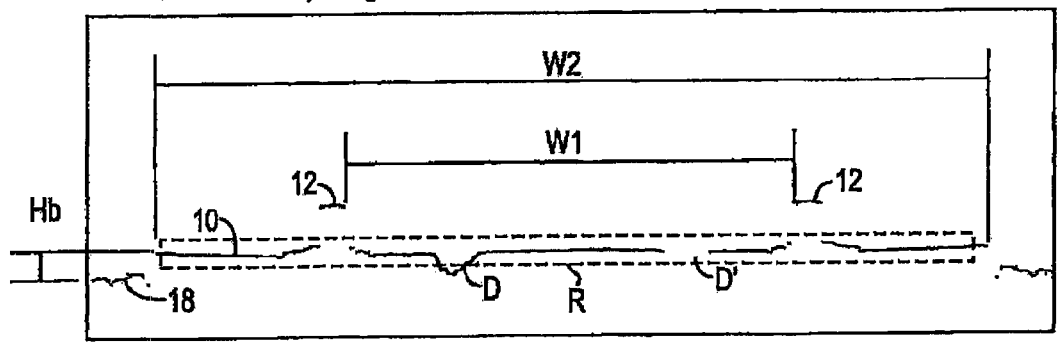
FIG. 8 illustrates an example frame of railroad track obtained with the disclosed inspection system for determining defects in the crosstie, spacing of the rail, size of the crossties, and ballast height relative to the crosstie.

In another example, the defects in the crossties 10 can be determined from the image data. As shown in FIG. 8, an example frame of railroad track obtained with the disclosed inspection system is shown. Defects D and D' are shown in the crosstie 10. Computer analysis can detect if the crosstie 10 has a defect, for example, by determining whether portions D of the contour of the cross tie lie outside a region of interest R or whether portions D' of the contour are absent within the region R. As is known, defects in a crosstie can include cracks, splits, or breaks in the ties. Using the plurality of image data near such a defect, computer analysis can determine the width and length of the defect. For example and as seen in FIGS. 11-12, the plurality of image data can be used to estimate the width W and length L of the crack shown in the edge of the crosstie. In some instances, the computer analysis can determine the depth of the defect, for example, when the orientation of the defect allows light from the laser to be projected within the defect and to be captured by the camera. In one embodiment, the angle between the laser and the camera can be relatively small so that the light projecting into a recessed defect can still be captured by the camera positioned almost parallel to the beam of laser light.

In another example, the spacing or gage of the rail or length of the crossties can be determined from the image data. In FIG. 8, an edge detecting technique known in the art can be used to find edges of the rail contours 12 in the frame, and the distance W1 between the edges can be calculated to estimate the spacing of the rails 12. Similarly, an edge detecting technique known in the art can be used to find edges of the crosstie contour 10 in the frame, and the distance W1 between the edges can be calculated to estimate the width W2 of the crosstie 10.

In another example, the height of ballast 18 relative to the crosstie 10 can be determined from the image data. In FIG. 8, a line fitting technique can determine the level of the ballast 18 and the level of the crosstie 10, and the difference between these levels can estimate the height $H_B$ of the ballast 18 relative to the crosstie 10. In another example, the scans of the railroad track can be used to determine the size of stones in the ballast 18. This can be done by analyzing a region of interest having ballast 18 and estimating sizes of the ballast stone using curvatures in the contour of the ballast 18.

Figure 9:
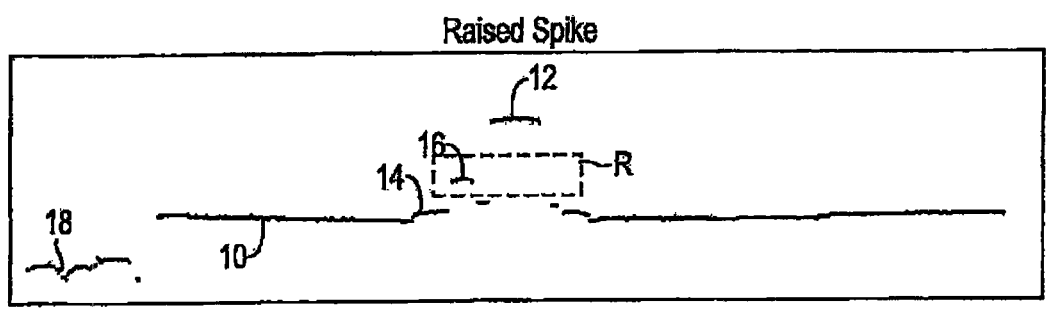
FIG. 9 illustrates an example frame of railroad track obtained with the disclosed inspection system for determining a raised spike.

In another example, raised spikes can be detected from the image data. Referring to FIG. 9, an example frame of railroad track obtained with the disclosed inspection system is illustrated. To determine whether there is a raised spike, a region of interest R can be analyzed to determine whether a portion of the contour representing a raised spike 16 occur within the region R.

Figure 10:
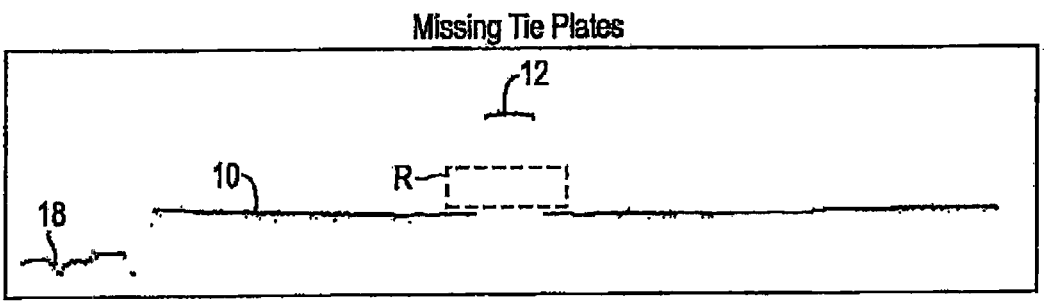
FIG. 10 illustrates an example frame of railroad track obtained with the disclosed inspection system for determining a missing tie plate.

In other examples, missing tie plates, misaligned tie plates, or sunken tie plates can be detected from the image data. Referring to FIG. 10, an example frame of railroad track obtained with the disclosed inspection system is illustrated. The missing or sunken tie plate can be detected, for example, by analyzing a region of interest R and determining whether a portion of the contour representing a tie plate occurs or does not occur within the region R. A misaligned tie plate can be determined by line fitting the portion of the contour of the tie plate and comparing the orientation of the line to that of the crosstie, for example.

In regards to FIG. 13, an alternative exemplary embodiment of inspection system 30 will now be described. In this embodiment, inspection system 30 may be constructed and operated in the same way as described in relation to the previous embodiments. However, in this embodiment, the present invention has been adapted to allow more efficient daylight operation. Inspection system 30 utilizes three line-generating lasers 40 mounted above the surface to be inspected. Center laser 40 is mounted in the center of framework 32 and scans the surface area within its angular spread β, while the outer two lasers 40 scan the outer periphery of the inspected surface within their angular spread β. If, for example, a railroad track were being inspected, center laser 40 could scan the full 9-foot tie, while the outer lasers would scan the rails.

In this exemplary embodiment, the two outer lasers 40 are each tilted outwardly away from the center laser at an approximate angle γ of 10 degrees. The two outer lasers 40 are tilted in this embodiment in order to allow the inspection system 30 to be stowed into a truck bed, for example, while still being capable of scanning a 9 foot tie of a railroad track bed. By tilting lasers 40 outward, the present invention achieves the scanning width required to inspect the ties, while still physically fitting within the trucks limit. However, since the present invention can also be used to inspect other surfaces, the two outer lasers 40 may not be tilted whatsoever dependent upon the practical requirements of that application.

Figure 13:
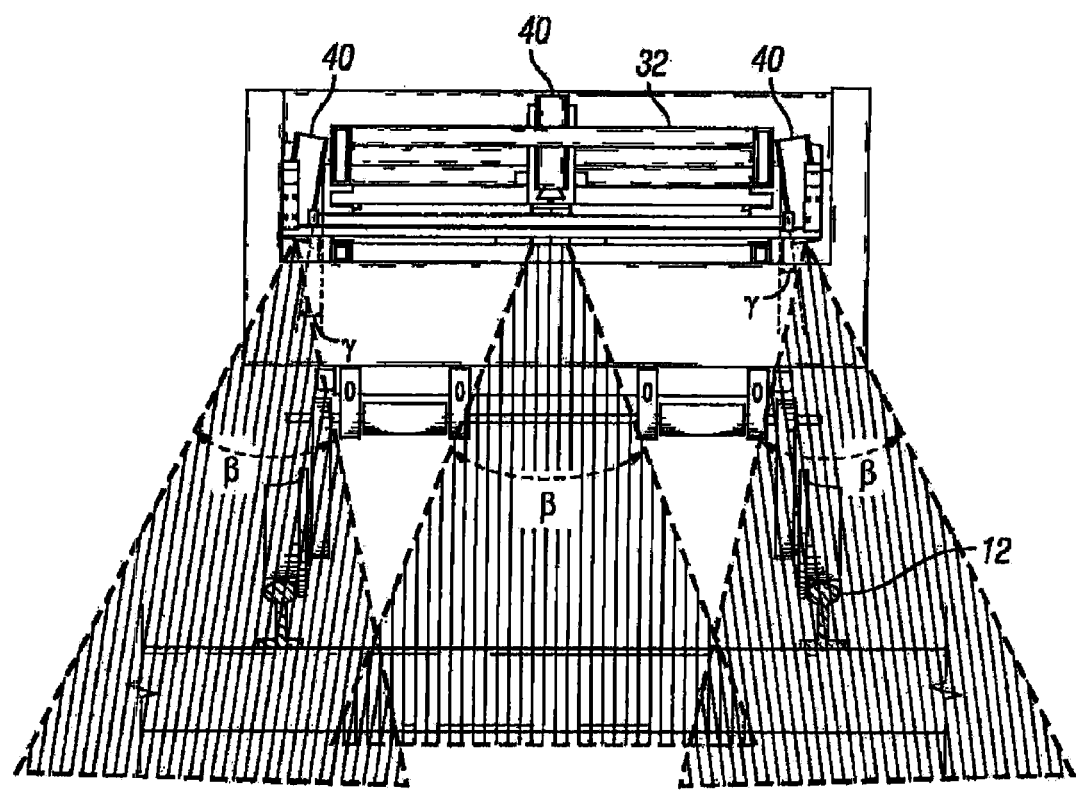
FIGS. 13 and 14 illustrate an alternate exemplary embodiment of the present invention.

Further referring to the exemplary embodiment of FIG. 13, lasers 40 are 7-watts lasers, each having a 45 degree angular spread β. However, angular spread β could be more or less depending upon the distance between lasers 40 and the inspected surface as understood by those skilled in the art having the benefit of this disclosure. The intensity of the laser line L (i.e., laser beam L) projected by lasers 40 onto the inspected surface is at least 0.15 watts per inch of the width of laser line L projected onto the surface. In the most preferred embodiment, the intensity is 0.18 watts per inch of the width of laser line L projected onto the surface. The number of lasers 40 utilized may be more or less than three, as long as the number utilized can provide the necessary wattage per inch of laser line L. Accordingly, those ordinarily skilled in this art having the benefit of this disclosure realize there are a variety of laser combinations which could provide this minimum wattage.

Figure 16:
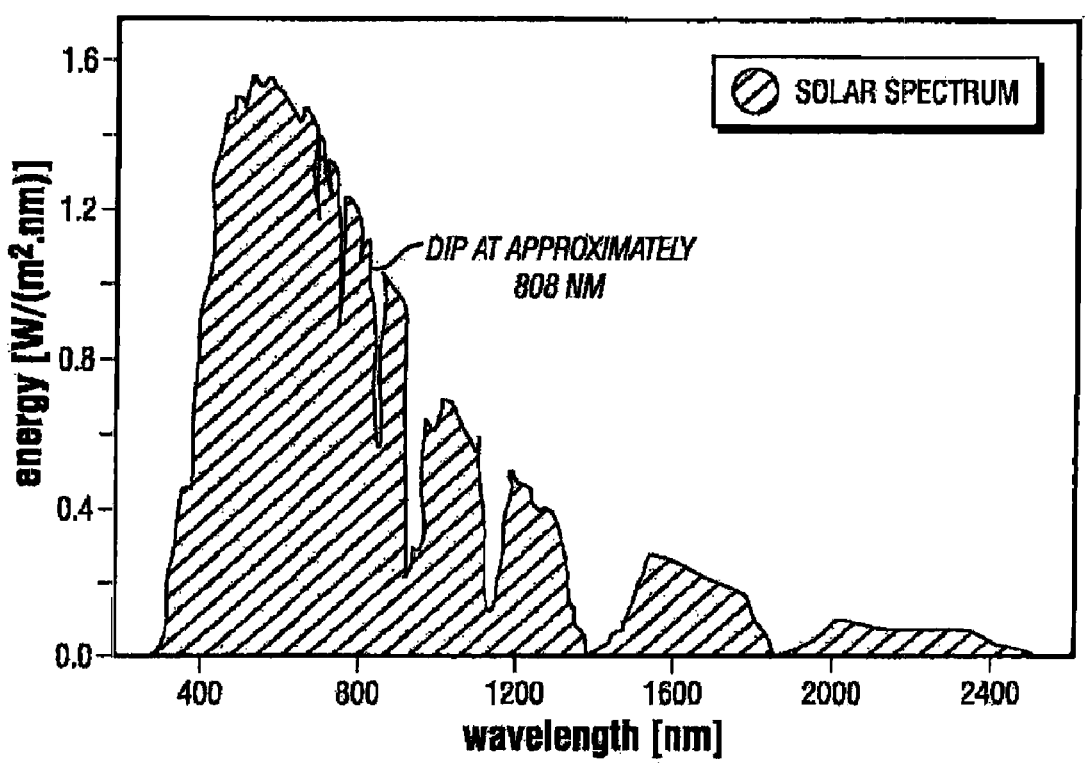
FIG. 16 illustrates a graph plotting the energy of the sun's solar radiation at specific wavelengths according to an exemplary embodiment of the present invention.

Further referring to the exemplary embodiment of FIG. 13, the combined use of the three lasers 40 provides a higher light intensity, thereby producing a line of light at a specific wavelength which is more intense than the solar radiation at that same wavelength. In this exemplary embodiment, lasers 40 are each 808 nm+/−2 nm wavelength lasers as understood in the art. This choice of laser wavelength corresponds to a dip in the solar spectrum at approximately 808 nm caused by the sunlight penetrating the earth's atmosphere, as illustrated in the graph of FIG. 16. Here, the solar spectrum is shown at sea level ranging from roughly 400 nm to above 2400 nm, which includes UV, visible and infrared wavelengths. At approximately 808 nm, there is a sharp dip in sun's solar energy. Thus, the 808 nm lasers utilized in the present invention were specifically chosen because their wavelengths at approximately 808 nm are more intense than the solar radiation at the same wavelength, thereby allowing their radiated light to be detected in sunlight via cameras 50. Those ordinarily skilled in the art having the benefit of this disclosure realize other laser wavelengths may be utilized to take advantage of other dips in solar radiation, in accordance with the present invention.

Figure 14:
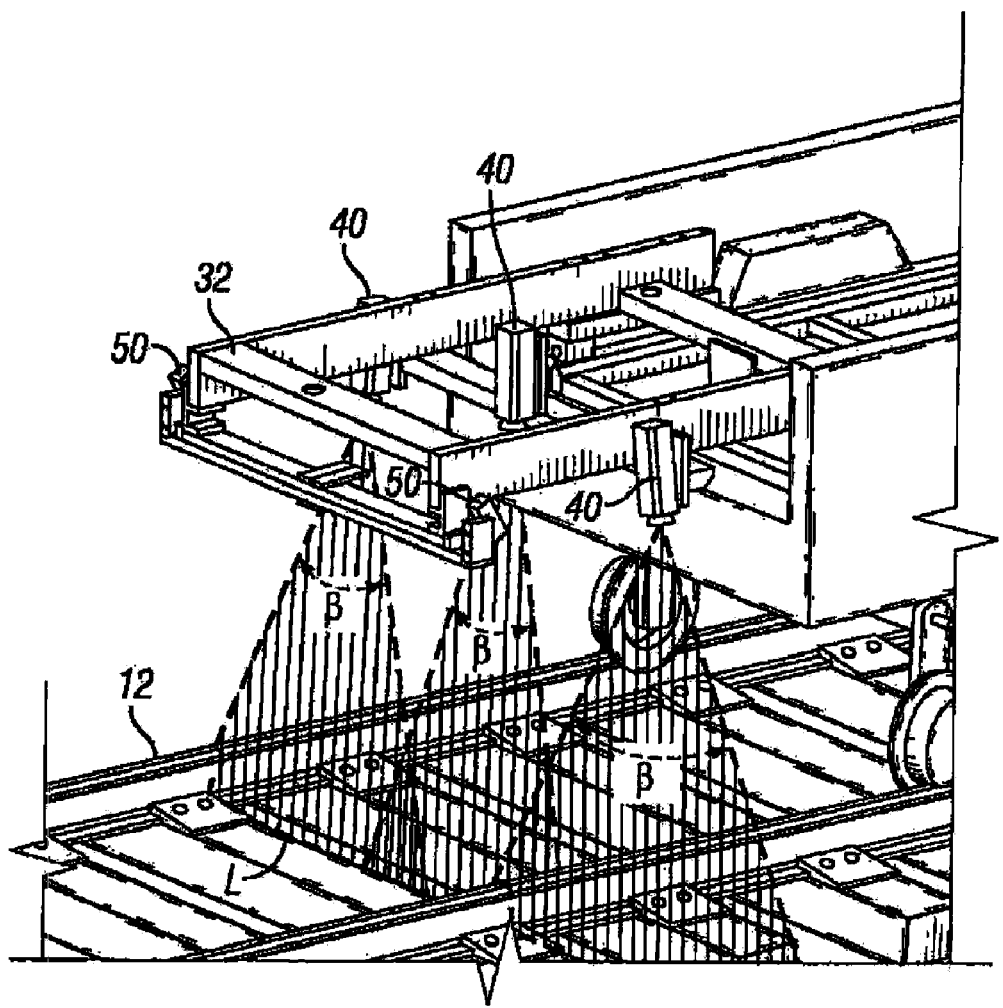
Figure 15:
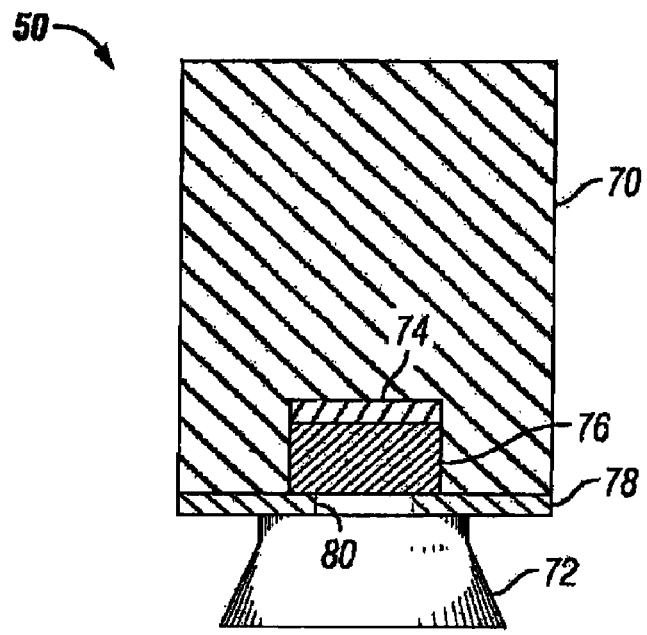
FIG. 15 illustrates an exemplary embodiment of a camera according to the present invention.

Referring to FIGS. 14 and 15, an exemplary alternative embodiment of cameras 50 of the present invention will now be described. As previously discussed, cameras 50 are mounted to framework 32 and send image data of the inspected surface (in this example, a railroad track) to the processing device or computer 60 via wired or wireless transmission lines. However, in this exemplary embodiment, cameras 50 each include a housing 70 having a lens 72. Within housing 70 is a charge coupled device 74, or CCD, which is an analog shift register that enables transmission of analog signals through successive stages controlled by a clock signal. CCD 74 can be used as a form of memory or for delaying samples of analog signals, as understood in the art. In the alternative, however, a CMOS sensor as understood in the art may be utilized to capture images as well. Those ordinarily skilled in the art having the benefit of this disclosure realize there are a variety of cameras which may be utilized with the present invention.

As illustrated in FIG. 15, CCD 74 is placed adjacent an optical bandpass filter 76. In this exemplary embodiment, bandpass filter 76 was chosen to pass a band of the laser 40's wavelength −2 nm and +1 nm, while filtering at least OD4 for the remainder of camera 50's response range from 300 nm to 1100 nm, excluding the ramp-up and ramp-down areas that exist near the band pass region as understood by those ordinarily skilled in the art having the benefit of this disclosure. Therefore, by utilizing 808 nm lasers, bandpass filter 76 passes a wavelength approximately 806-810 nm, while filtering out the remaining solar radiation. Since there is a dip in the sun's radiation at this wavelength, the line generated by lasers 40 is readily detectable in the sunlight.

In order to reduce the blue shift associated with light passing through a filter at an angle, bandpass filter 76 is mounted between lens 72 and CCD 74. Typically, when light passes through a filter at extreme angles, in order to get the same wavelength of light at many different angles, you must have a filter with a wide passband. If a filter were placed on the exterior of the lens, light would come in at an extreme angle. However, by moving the filter behind the lens, the light is much more parallel and the blue shift effect is dramatically decreased. This reduction in the blue shift results in a much tighter filter bandpass, which is necessary to filter out as much solar radiation as possible. Accordingly, bandpass filter 76 is mounted behind lens 72.

A spacer 78 is positioned on the other side of bandpass filter 76 opposite CCD 74. Spacer 76 comprises an opening 80 which allows image data to be collected from lens 72. In this embodiment, bandpass filter 76 screens out as much nonlaser-generated light as possible, thereby enabling daytime inspection. Also, this embodiment results in a slight increase in focal length due to the light passing through filter 76. This phenomenon is compensated for by mounting CCD 74 slightly further from lens 72 via the use of spacer 78 located between lens 72 and camera housing 70. Spacer 78 changes the orientation of the lens 72 relative to CCD 74. Spacer 78 may be, for example, a precision shim washer. In the alternative, however, spacer 78 would not be necessary in embodiments utilizing a camera lens which has a sufficiently wide focusing range. Accordingly, those ordinarily skilled in the art having the benefit of this disclosure realize there are a variety of spacers which could be utilized with the present invention, and that the need for spacer 78 may be negated through lens choice.

In yet another exemplary embodiment of the present invention, rail seat abrasion may be predicted with a high level of accuracy. This embodiment utilizes the image data previously described and the application of algorithms that adjust for vehicle tilt. As inspection system 30 moves along the track, it may encounter curves or bends in the track which result in a suspension lean of the system 30 as it moves through the curve. This lean results in the railroad track itself leaning either to the left or right in the field of the cameras 50 view. The resulting measurement data is used to target which ties should be physically inspected for rail abrasion. However, the leaning, or tilt, must be taken into account when identifying ties to be inspected for rail seat abrasion, as will be described below.

Figure 17:
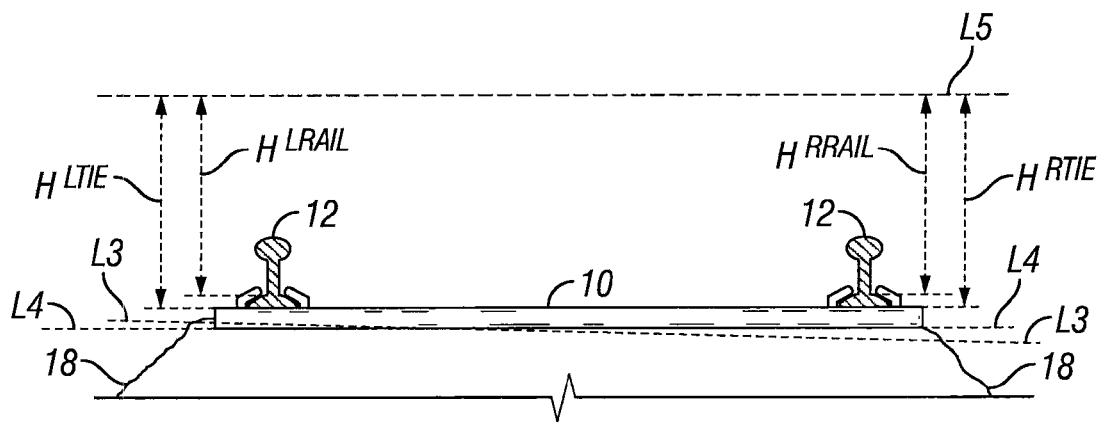
FIG. 17 illustrates a profile image of a rail road track tilted according to an exemplary embodiment of the present invention.

The tilt phenomena is more clearly described in reference to the profile image depicted in FIG. 17. Although this image would be three dimensional as previously described, it is illustrated here as a profile for simplicity. In this exemplary embodiment, left and right rails 12 are illustrated laying atop concrete tie 10. Line L3 represents level ground. Although not shown, it is envisioned this section of the track is within a curve, and an inspection system of the present invention is moving along the track resulting in an angular tilt of cross ties 10 represented by line L4. As such, the track is tilting slightly to the left. In order to determine whether rail seat abrasion is present, height measurements of the each rail must be taken in accordance with the methods previously described. However, in this example, the height of right rail 12 would appear taller then left rail 12, resulting in skewed data measurements. Accordingly, during significant empirical and mathematical research for the present invention, a standard tilt correction factor of 0.12 was determined. This tilt correction factor is incorporated into algorithms of the present invention in order to adjust for tilt caused by variations in vehicle suspension, rail height placement standards, and other factors unrelated to rail seat abrasion.

Figure 18:
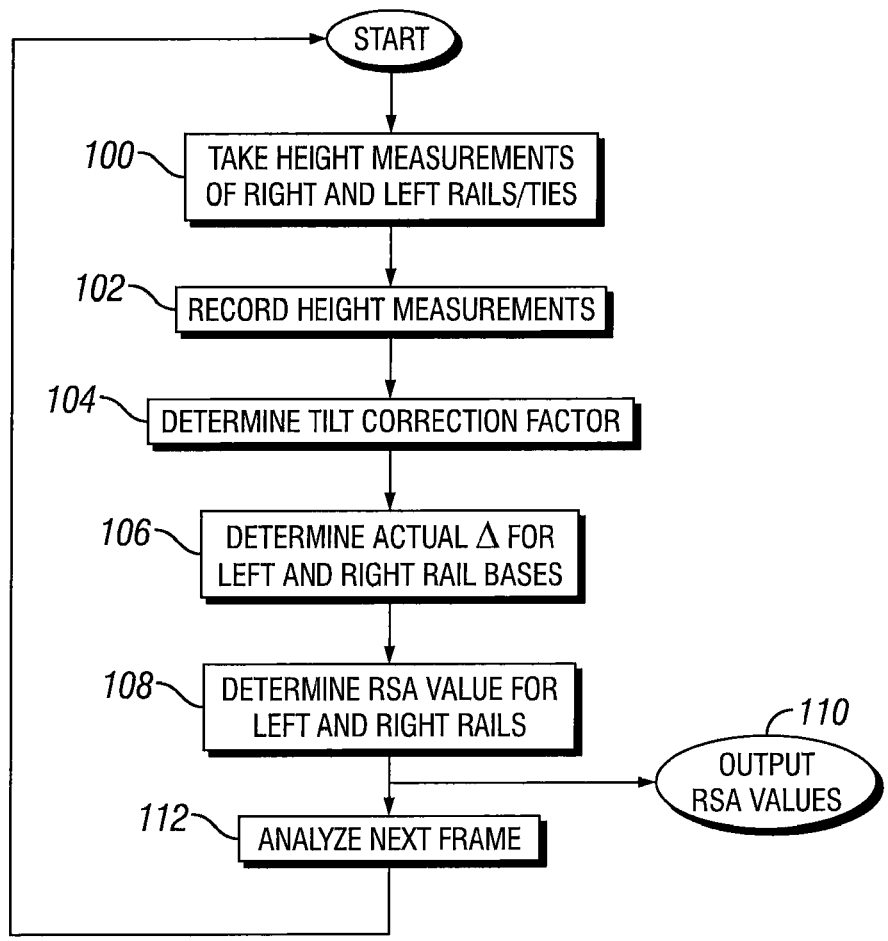
FIG. 18 is a flow chart illustrating a method of determining rail seat abrasion according to an exemplary embodiment of the present invention.

In further reference to the exemplary embodiment of FIG. 17 and the exemplary flow chart of FIG. 18, a tilt correction algorithm for the present invention is now described. Based on the three-dimensional image data received from cameras 50 as previously described, at step 100, a measurement is taken of the rail base height of each rail, left ($H_{Lrail}$) and right ($H_{Rrail}$), as well as each tie, left ($H_{Ltie}$) and right ($H_{Rtie}$) The rail base and tie heights are the heights of the rails and ties relative to line L5, representing the top of the three-dimensional image. Once the dimensional images have been captured, the rail base heights and tie heights are determined based upon the vertical pixel count of $H^{Lrail}$, $H^{Rrail}$, $H_{Ltie}$ and $H_{Rtie}$, which is then normalized based upon a 0-255 measurement index. In operation, the laser light reflected by the track structure that passes through the camera lens is projected onto the camera CCD, as previously described. The dimensions of each CCD, in an exemplary embodiment, are 256 pixels by 1536 pixels. In this exemplary embodiment, there are two cameras placed roughly side by side. Accordingly, the total field of view for the two cameras combined has a field of view of 256 pixels by 3072 pixels—hence the 0-255 index. Those ordinarily skilled in the art having the benefit of this disclosure realized there are a variety of methods to determine the heights.

Thereafter, at step 102, inspection system 30 records the uncorrected $H^{Lrail}$, $H^{Rrail}$, $H^{Ltie}$, and $H^{Rtie}$ height measurements of rails 12 and tie 10 based upon the pixel value of each. Then, at step 104, the processor of inspection system 30 derives the tilt correction factor (TC) based upon the following equation:

$$TC = (H^{Lrail} - H^{Rrail}) \tag{.12}$$

Thereafter, at step 106, the actual Δ (i.e., the distance/difference between two points) is determined for both the right and left rail bases based upon the following equation:

$$\Delta^{leftRail} = (H^{Lrail} - H^{Ltie}) - TC$$

$$\Delta^{rightRail} = (H^{Rrail} - H^{Rtie}) + TC$$

The result is the actual Δ between the rail base height and tie elevation for both the right and left rails. Please note the foregoing equations take into account the lean, or tilt, of the truck, whether left or right.

Then, at step 108, the rail seat abrasion value ("RSA") for the right and left rail bases is determined based upon the following formula:

$$RSA^{Lrail} = (^{32}/_{54}) - (\Delta^{leftRail}/50)$$

$$RSA^{Rrail} = (^{32}/_{54}) - (\Delta^{rightRail}/50)$$

The "$^{32}/_{54}$" is the expected Δ between the rail base and tie elevation, signifying no rail seat abrasion. The "50" represents the rate of collection in height, 50 pixels per inch. Those ordinarily skilled in the art realize the 50 pixels inch rate of collection could vary based upon the geometry of the camera and laser setup.

Thereafter, at step 110, the RSA values are outputted in a form suitable for further analysis. At step 112, the next frame image is then analyzed and the algorithm begins again. The RSA data provides accurate measurements of rail seat abrasion and allows for effective, accurate identification of potential safety hazards and wear points requiring monitoring or corrective action to ensure track safety.

An exemplary system for determining rail seat abrasion of a rail road track comprises at least one light generator positioned adjacent the rail road track, the light generator adapted to project a beam of light across the rail road track; at least one camera positioned adjacent the rail road track for receiving at least a portion of the light reflected from the rail road track and for generating at least one image representative of a profile of at least a portion of the rail road track, and at least one processor adapted to perform the steps comprising: analyzing the at least one image; and determining whether rail seat abrasion is present along the rail road track, wherein, when determining whether rail seat abrasion is present, the at least one processor compensates for a tilt of the rail road track.

In other exemplary embodiments, the processor compensates for the tilt of the rail road track by the steps comprising: determining a height of a left rail base, right rail base, left crosstie and right crosstie; determining a tilt correction factor; determining an actual delta for the right and left rail bases; and determining a rail seat abrasion value for the right and left rail bases. In yet another exemplary embodiment, the step of determining the heights further comprises the steps of: determining vertical pixel counts for each of the heights of the left rail base, right rail base, left crosstie and right crosstie; and normalizing the vertical pixel counts based upon a measurement index.

In other exemplary embodiments, the step of determining the tilt correction factor is accomplished based upon the left and right rail base heights and a standard tilt correction factor. In yet another exemplary embodiment, the step of determining the actual delta is accomplished based upon the tilt correction factor. Also, other embodiments provide for the step of determining the rail seat abrasion value to be accomplished based upon the actual delta.

Exemplary methods of the present invention provide a method for determining rail seat abrasion of a rail road track, the method comprising the steps of: determining a height of a left rail base, right rail base, left crosstie and right crosstie; recording the heights of the left rail base, right rail base, left crosstie and right crosstie; determining a tilt correction factor; determining an actual delta for the right and left rail bases; and determining a rail seat abrasion value for the right and left rail bases. Another exemplary method provides a method the step of determining the heights further comprises the steps of: determining vertical pixel counts for each of the heights of the left rail base, right rail base, left crosstie and right crosstie; and normalizing the vertical pixel counts based upon a measurement index.

Further exemplary methods provide methods wherein the step of determining the tilt correction factor is accomplished based upon the left and right rail base heights and a standard tilt correction factor. In other examples, the step of determining the actual delta is accomplished based upon the tilt correction factor. In other examples, the step of determining the rail seat abrasion is accomplished based upon the actual delta for the right and left rail bases.

In yet another exemplary method of the present invention, a method for determining rail seat abrasion of a rail road track is provided, the method comprising the steps of: moving an inspection system along the track; receiving image data corresponding to at least a portion of the track; determining a measurement of the rail seat abrasion for the portion of the track, wherein the measurement are adjusted for tilt encountered as the inspection system moves along the track; and determining whether rail seat abrasion exists based upon the adjusted measurement. In another exemplary method, the step of determining a measurement of the rail seat abrasion further comprises the steps of: determining a height of a left rail base, right rail base, left crosstie and right crosstie; determining a tilt correction factor; determining an actual delta for the right and left rail bases; and determining a rail seat abrasion value.

In other exemplary methods, the step of determining the heights further comprises the steps of: determining vertical pixel counts for each of the heights of the left rail base, right rail base, left crosstie and right crosstie; and normalizing the vertical pixel counts based upon a measurement index. In another exemplary method, the step of determining the tilt correction factor is accomplished based upon the left and right rail base heights and a standard tilt correction factor. In yet another method, the step of determining the actual delta is accomplished based upon the tilt correction factor. In another method, the step of determining the rail seat abrasion value is accomplished based upon the actual delta.

Although various embodiments have been shown and described, the present invention is not so limited and will be understood to include all such modifications and variations as would be apparent to one skilled in the art. Accordingly, the invention is not to be restricted except in light of the attached claims and their equivalents.

We claim:

1. A system for determining rail seat abrasion of a rail road track, the system comprising:
    at least one light generator positioned adjacent the rail road track, the light generator adapted to project a beam of light across the rail road track;
    at least one camera positioned adjacent the rail road track for receiving at least a portion of the light reflected from the rail road track and for generating at least one image representative of a profile of at least a portion of the rail road track, and
    at least one processor adapted to perform the steps comprising:
        analyzing the at least one image; and
        determining whether rail seat abrasion is present along the rail road track,
    wherein, when determining whether rail seat abrasion is present, the at least one processor compensates for a tilt of the rail road track.

2. A system as defined in claim 1, wherein the processor compensates for the tilt of the rail road track by the steps comprising:
    determining a height of a left rail base, right rail base, left crosstie and right crosstie;
    determining a tilt correction factor;
    determining an actual delta for the right and left rail bases; and
    determining a rail seat abrasion value for the right and left rail bases.

3. A system as defined in claim 2, wherein the step of determining the heights further comprises the steps of:
    determining vertical pixel counts for each of the heights of the left rail base, right rail base, left crosstie and right crosstie; and
    normalizing the vertical pixel counts based upon a measurement index.

4. A system as defined in claim 2, wherein the step of determining the tilt correction factor is accomplished based upon the left and right rail base heights and a standard tilt correction factor.

5. A system as defined in claim 2, wherein the step of determining the actual delta is accomplished based upon the tilt correction factor.

6. A system as defined in claim 2, wherein the step of determining the rail seat abrasion value is accomplished based upon the actual delta.

7. A method for determining rail seat abrasion of a rail road track, the method comprising the steps of:
    (a) determining a height of a left rail base, right rail base, left crosstie and right crosstie;
    (b) recording the heights of the left rail base, right rail base, left crosstie and right crosstie;
    (c) determining a tilt correction factor;
    (d) determining an actual delta for the right and left rail bases; and
    (e) determining a rail seat abrasion value for the right and left rail bases.

8. A method as defined in claim 7, wherein step (a) further comprises the steps of:
    determining vertical pixel counts for each of the heights of the left rail base, right rail base, left crosstie and right crosstie; and
    normalizing the vertical pixel counts based upon a measurement index.

9. A method as defined in claim 7, wherein the step (c) is accomplished based upon the left and right rail base heights and a standard tilt correction factor.

10. A method as defined in claim 7, wherein step (d) is accomplished based upon the tilt correction factor.

11. A method as defined in claim 7, wherein step (e) is accomplished based upon the actual delta for the right and left rail bases.

12. A method for determining rail seat abrasion of a rail road track, the method comprising the steps of:
    (a) moving an inspection system along the track;
    (b) receiving image data corresponding to at least a portion of the track;
    (c) determining a measurement of the rail seat abrasion for the portion of the track, wherein the measurement are adjusted for tilt encountered as the inspection system moves along the track; and
    (d) determining whether rail seat abrasion exists based upon the adjusted measurement.

13. A method as defined in claim 12, wherein step (c) further comprises the steps of:
    determining a height of a left rail base, right rail base, left crosstie and right crosstie;
    determining a tilt correction factor;
    determining an actual delta for the right and left rail bases; and
    determining a rail seat abrasion value.

14. A method as defined in claim 13, wherein the step of determining the heights further comprises the steps of:
    determining vertical pixel counts for each of the heights of the left rail base, right rail base, left crosstie and right crosstie; and
    normalizing the vertical pixel counts based upon a measurement index.

15. A method as defined in claim 13, wherein the step of determining the tilt correction factor is accomplished based upon the left and right rail base heights and a standard tilt correction factor.

16. A method as defined in claim 13, wherein the step of determining the actual delta is accomplished based upon the tilt correction factor.

17. A method as defined in claim 13, wherein the step of determining the rail seat abrasion value is accomplished based upon the actual delta.

* * * * *